March 11, 1924.
F. C. SUTTER
1,486,201
AUTOMOBILE RADIATOR PROTECTOR
Filed Dec. 17, 1917
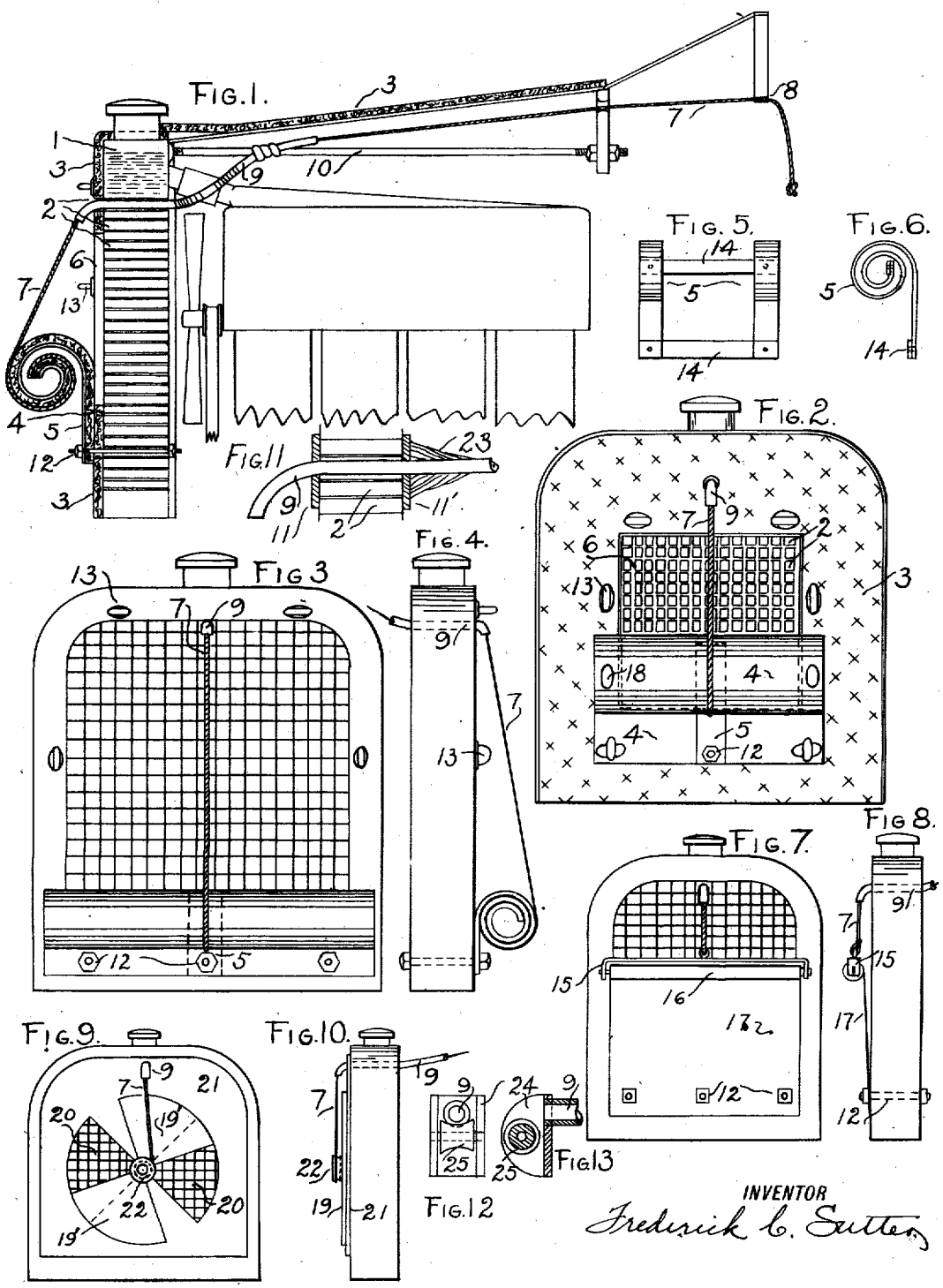

Patented Mar. 11, 1924.

1,486,201

UNITED STATES PATENT OFFICE.

FREDERICK C. SUTTER, OF DETROIT, MICHIGAN.

AUTOMOBILE RADIATOR PROTECTOR.

Application filed December 17, 1917. Serial No. 207,502.

*To all whom it may concern:*

Be it known that I, FREDERICK C. SUTTER, a citizen of the United States, residing at Detroit, in the county of Wayne and State of Michigan, have invented new and useful Improvements in Automobile Radiator Protectors, of which the following is a specification.

This invention has for its object the control of the operating temperature of an automobile motor by the driver from his seat. The advantage of running an automobile motor at a properly high temperature and the disadvantages of running the same at too low a temperature are now so well known to all users of automobiles that little further need be said on the subject. In cold weather practically every driver of an automobile makes some attempt to control the temperature of his motor and raise same to a point at which satisfactory operation takes place. In many cases the means employed consist of a fragment of cardboard, heavy paper or sheet metal placed in front of the radiator to partly obstruct the flow of air through the same. Many drivers make use of flaps of flexible material which may be rolled up by hand and fastened in one of several positions between closed and open to accomplish the same results. A very few radiators have been manufactured in which is incorporated some means of varying the flow of air through the radiator controllable from the driver's seat but in general it may be said that no device has yet been produced which is readily attached to existing cars or which may be embodied in the design of new cars without manufacturing complications.

My invention possesses these qualifications which any successful and popular adjustable radiator shield must of necessity possess; it is operable by the driver from his seat, it has a range of adjustment to meet all conditions, it is inexpensive and easily applied to existing cars with no mechanical changes or fitting other than drilling two or three small holes for attachment, it is simple in construction and not liable to derangement from mud, snow or freezing rain clogging the parts, it may readily be built into new cars, it is sightly and free from fantastic appearance, in fact one of the forms which it may take, namely the rolling flap, is precisely similar in appearance to the rolling flap of the standard quilted hood cover in universal use. It is the failure of proposed devices to meet some or all of the above requirements that has prevented these from being adopted by automobile users.

In the accompanying drawings similar numerals refer to similar parts and

Fig. 1 is a general irregular sectional view of the forward portion of an automobile with my invention applied to same, small parts magnified to show construction. Fig. 2 is a front view of the same. In these views my invention is shown in the form which it takes when embodied in or as a part of a hood and radiator cover. Figs. 3 and 4 are front and side views of the form my invention takes when used as a radiator shield without association with any other auxiliary covers. Figs. 5 and 6 are front and side views of coiled springs which may be used in my shields. Figs. 7 and 8 are front and side views of another form of my invention in which my shield instead of rolling up upon itself is rolled upon a spring actuated roller. Figs. 9 and 10 are front and side views of a radiator cover with my control attached. Fig. 11 is a section of a portion of a radiator with my guide tube occupying one of the air passages of same. Figs. 12 and 13 are front view and section of a pulley device attached to the end of a guide tube.

1 is the radiator and 2 the air passages of same. 3—3 is a hood cover such as are in common use with the usual rectangular opening 6 in that portion which covers the radiator. 4 is a flexible flap somewhat larger than the opening 6 and attached by its lower edge to the radiator cover near the lower edge of the opening 6. The flap 4 contains the coiled or spiral spring 5 which keeps it rolled up near the bottom of the opening 6. A bolt 12 passes through the end of the spring and the flap, and through one of the air passages of the radiator thus holding the outer end of the spring in position. 7 is a flexible cable or cord attached to the inner end of the flap and which rolls up with the flap when same is rolled up by the spring 5. Cord 7 enters the tube 9, in which it is led through the radiator and past obstructions such as the hose connection or the fan which otherwise might interfere with its operation. Cord 7 leaves tube 9 at some point where it has a fair run to the dash where it is held by some convenient form of clasp 8. The tube 9 is small enough in diameter to pass through one of the air passages of the radiator, it has its outer end bent into a short smooth curve, and being, preferably, of some soft material such as copper it is easily bent in smooth curves around obstructions when installed. Instead of having its outer end curved, tube 9 may have a pulley terminal 24 attached to it with a small pulley 25 over which the cord 7 may run. Tube 9 may be tied or taped to any convenient part such as the radiator rod 10 or it may be fixed snugly into the radiator as shown in Fig. 11 in which 11 and 11' are washers on the tube, and 23 is tape or cord wrapped about the inner part of the tube. Washer 11 is attached to the tube while washer 11' is free, so that the effect of the tape 23 is to hold the tube firmly in position. This method of holding the tube is satisfactory in case short tubes extending but little beyond the inner face of the radiator are used. While I have shown my cable tube 7 inserted in an air passage in the center of the radiator at its top it is evident that same may be passed through any air space, it sometimes being more convenient to pass the tube through a space somewhat to one side of the central line of the radiator, as in this position less bending is required to clear other parts behind the radiator. Fasteners 13 of any convenient form may be used to button the flap in position if desired. If several springs 5 are used in the curtain 4 it may be desirable to connect the ends of these by means of a cross member 14. In Figs. 7 and 8, 16 is a spring actuated roller similar to the shade roller in common use except that the pawls are omitted, held in the movable yoke 15, on which the curtain 17 is rolled. Curtain 17 is attached by its outer edge near the bottom of the radiator by means of bolts passing through the radiator air passages, so that as yoke and roller 15 and 16 are raised the curtain is payed out thus covering the radiator and obstructing the flow of air through the same. In all these various forms the cord 7 operates as shown in Figs. 1 and 2. In Figs. 9 and 10, 21 is a radiator cover with sectors 20—20 cut away to expose the radiator. 19 is a rotatable member with vanes 19', mounted on spool 22 carried by pin borne by cover 21. Cable 7 is wound upon the spool so that pulling upon same rotates 19 so that its vanes uncover the openings 20 thus allowing the flow of air through the radiator. Member 19 is returned to its former closed position by means of a coil spring within the spool. It is obvious that my control is applicable to a very wide variety of adjustable shields such as vanes, shutters, slides and the like.

I claim—

1. The combination with a radiator having ventilation passages extending from front to rear thereof, of a shield movable parallel to the front face of said radiator, a flexible member having a portion extending through one of said ventilation passages and another portion extending adjacent to the front face of said radiator and secured to said shield, and a tube insertable in said ventilation passage and surrounding said flexible member to guide the same and prevent contact thereof with the wall of said ventilation passage.

2. The combination with a radiator having ventilation passages extending from front to rear thereof, of a shield at the front of said radiator and movable substantially parallel to its front face, a flexible member having a portion passing through one of said ventilation passages and another portion extending near the front face of said radiator and secured to said shield, and a tube insertable in said ventilation passage to guide said flexible member and prevent engagement thereof with the wall of said ventilation passage, said tube being curved for a portion of its length forward of the front face of said radiator.

3. The combination with a radiator having ventilation passages extending from front to rear thereof, of a shield at the front of said radiator and movable substantially parallel to its front face, a flexible member having a portion passing through one of said ventilation passages and another portion at the front of said radiator and secured to said shield, and a tube insertable in said ventilation passage and surrounding said flexible member to guide the same, and to prevent rubbing action thereof upon the wall of said ventilation passage, said tube being bendable and extending beyond the front and rear of faces of the radiator, the portion of the tube extending beyond the front face of the radiator being downwardly curved.

4. The combination with a radiator having ventilation passages extending from front to rear thereof, of an adjustable shield at the front of said radiator, a flexible member secured to said shield and passing through one of said ventilation passages, and a tube insertable in said ventilation passage and surrounding said flexible member to guide the same and prevent contact thereof with the wall of said ventilation passage.

5. The combination with a radiator having ventilation passages extending from front to rear thereof, of an adjustable shield at the front of said radiator, a flexible member connected to said shield and passing through one of said ventilation passages, and a guide mounted on said radiator and arranged in relation to said ventilation passage and flexible member so as to prevent said flexible member engaging the wall of said ventilation passage.

6. The combination with a radiator having ventilation passages extending from front to rear thereof, and a fan at the rear thereof, of an adjustable shield at the front of said radiator, means for adjusting said shield passing through one of said ventilation passages and past said fan, and a tube insertable in said ventilation passage and surrounding said adjusting means to guide the same and prevent contact thereof with the wall of said ventilation passage, said tube directing said adjusting means to clear said fan.

7. The combination with a radiator having ventilation passages extending from front to rear thereof, of an adjustable shield at the front of said radiator, a member passing through one of said ventilation passages for adjusting said shield and a removable tube insertable in said ventilation passage and surrounding said adjusting member to guide the same and prevent contact thereof with the wall of said ventilation passage.

FREDERICK C. SUTTER.

Witnesses:
FLORENCE B. MAYHEW,
EMILY M. SUTTER.